United States Patent
Shieh et al.

(10) Patent No.: US 10,572,190 B2
(45) Date of Patent: Feb. 25, 2020

(54) PHYSICAL UNCLONABLE FUNCTION CODE PROVIDING APPARATUS AND PROVIDING METHOD THEREOF

(71) Applicant: Winbond Electronics Corp., Taichung (TW)

(72) Inventors: Ming-Huei Shieh, San Jose, CA (US); Chi-Shun Lin, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 421 days.

(21) Appl. No.: 15/598,293

(22) Filed: May 17, 2017

(65) Prior Publication Data

US 2018/0337777 A1   Nov. 22, 2018

(51) Int. Cl.
| | |
|---|---|
| *H04L 9/32* | (2006.01) |
| *G06F 3/06* | (2006.01) |
| *H04L 9/08* | (2006.01) |
| *G09C 1/00* | (2006.01) |
| *G06F 21/73* | (2013.01) |

(52) U.S. Cl.
CPC ............ *G06F 3/0679* (2013.01); *G06F 21/73* (2013.01); *G09C 1/00* (2013.01); *H04L 9/0866* (2013.01)

(58) Field of Classification Search
CPC .................................................. G11C 11/419
USPC ........................................................ 365/148
See application file for complete search history.

(56) References Cited

U.S. PATENT DOCUMENTS

| | | | |
|---|---|---|---|
| 9,947,391 B1* | 4/2018 | Mahatme | G11C 11/419 |
| 2014/0126306 A1 | 5/2014 | Otterstedt et al. | |
| 2015/0029784 A1* | 1/2015 | Yabuuchi | G11C 11/417 |
| | | | 365/154 |
| 2015/0071432 A1 | 3/2015 | Zhu et al. | |
| 2015/0146472 A1* | 5/2015 | Kitagawa | G11C 13/0069 |
| | | | 365/148 |
| 2015/0215115 A1 | 7/2015 | Pikus | |
| 2016/0148679 A1 | 5/2016 | Yoshimoto et al. | |
| 2016/0301534 A1 | 10/2016 | Chen | |
| 2017/0048072 A1* | 2/2017 | Cambou | H04L 9/3278 |
| 2017/0272258 A1* | 9/2017 | Tanamoto | H04L 9/0866 |
| 2018/0337777 A1* | 11/2018 | Shieh | G06F 3/0679 |

FOREIGN PATENT DOCUMENTS

CN          104658601          5/2015

OTHER PUBLICATIONS

"Office Action of Taiwan Counterpart Application", dated Mar. 28, 2018, p. 1-p. 6.

* cited by examiner

*Primary Examiner* — Min Huang
(74) *Attorney, Agent, or Firm* — JCIPRNET

(57) ABSTRACT

A PUF code providing apparatus includes a non-volatile memory cell pair and a data sensing circuit. The sensing circuit is coupled to the non-volatile memory cell pair, reads two initial statuses of the non-volatile memory cell pair and generates a PUF code by comparing the two initial statuses of the non-volatile memory cell pair.

14 Claims, 7 Drawing Sheets

PHYSICAL UNCLONABLE FUNCTION CODE PROVIDING APPARATUS AND PROVIDING METHOD THEREOF

BACKGROUND

Field of the Invention

The invention relates to a physical unclonable function (PUF) code providing apparatus and providing method thereof. Particularly, the invention relates to the PUF code providing apparatus by using non-volatile memory.

Description of Related Art

In recently years, PUF has been widely used in security product application. The PUF requires a function to create a die-unique- and random signature in each chip for security purpose. A highly reliable PUF is required especially when it is being used along with cryptographic hash modules for key generation. To achieve ultrahigh reliability, conventional art approach employs ECC based on helper data input. Such an approach not only increases the hardware overhead of the PUF but also reduces the entropy of an electronic system, resulting in both hardware and software security issues.

SUMMARY OF THE INVENTION

The invention is directed to a physical unclonable function (PUF) code providing apparatus and a providing method thereof, and the PUF code can be generated based on non-volatile memory cells.

The invention provides a PUF code providing apparatus including a non-volatile memory cell pair and a data sensing circuit. The sensing circuit is coupled to the non-volatile memory cell pair, reads two initial statuses of the non-volatile memory cell pair and generates a PUF code by comparing the two initial statuses of the non-volatile memory cell pair.

The invention also provides a PUF code providing method, step of the method includes: providing a non-volatile memory cell pair, wherein the non-volatile memory cell pair provide two initial statuses; and receiving the two initial statuses, and generating the PUF code by comparing the two initial statuses of the non-volatile memory cell pairs.

According to the above descriptions, a PUF code can be generated by comparing the two initial statuses of the non-volatile memory cell pair. Since the initial statuses of the non-volatile memory cells are random, and the PUF code can be randomly generated according to the two initial statuses of the non-volatile memory cell pair. Furthermore, the two initial statuses of the non-volatile memory cell pair are die-unique, and the PUF code can be a security code for an electronic system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
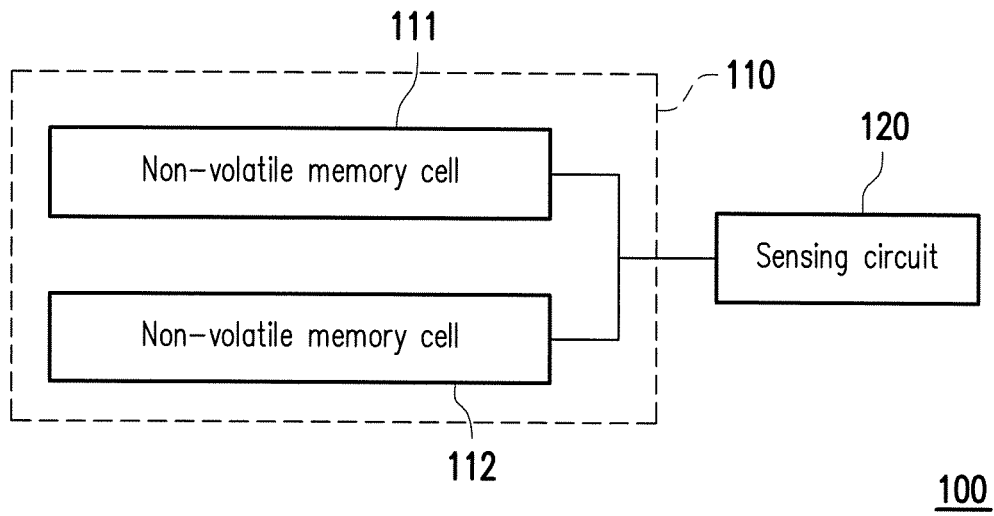
FIG. 1 illustrates a physical unclonable function (PUF) code providing apparatus according to an embodiment of present disclosure

Referring to FIG. 1, FIG. 1 illustrates a physical unclonable function (PUF) code providing apparatus according to an embodiment of present disclosure. The PUF providing apparatus 100 includes a non-volatile memory cell pair 110 and a sensing circuit 120. The non-volatile memory cell pair 110 includes two non-volatile memory cell 111 and 112. The non-volatile memory cell 111 and 112 are coupled to the sensing circuit 120. The non-volatile memory cell 111 and 112 respectively provide initial statuses to the sensing circuit 120, and the sensing circuit 120 can generates a PUF code by comparing the two initial statuses of the non-volatile memory cell 111 and 112.

For example, the initial statuses of the non-volatile memory cell 111 and 112 are a first initial resistance and a second initial resistance. The sensing circuit 120 may sense the first initial resistance by providing a first sensing current or a first sensing voltage to the non-volatile memory cell 111, and sense the second initial resistance by providing a second sensing current or a second sensing voltage to the non-volatile memory cell 112. The sensing circuit 120 may generate the PUF code equal to a first logic level if the first initial resistance larger than the second initial resistance, and generate the PUF code equal to a second logic level if the first initial resistance smaller than the second initial resistance. The first logic level is complementary to the second logic level. Each of the non-volatile memory cell 111 and 112 may be a resistive random-access memory (ReRAM) cell, a conductive bridging random-access memory (CBRAM) cell, a phase change random-access memory (PCRAM) cell, or a floating gate non-volatile memory cell.

It should be noted here, if the non-volatile memory cell pair 111 is a resistive random-access memory (ReRAM) cell pair, a conductive bridging random-access memory (CBRAM) cell pair, or a phase change random-access memory (PCRAM) cell pair, the two initial resistances may be provided by the non-volatile memory cells 111 and 112 which haven't been formed. Or, in another embodiment, the two initial resistances may be provided by the non-volatile memory cells 111 and 112 which have been formed.

Figure 2:
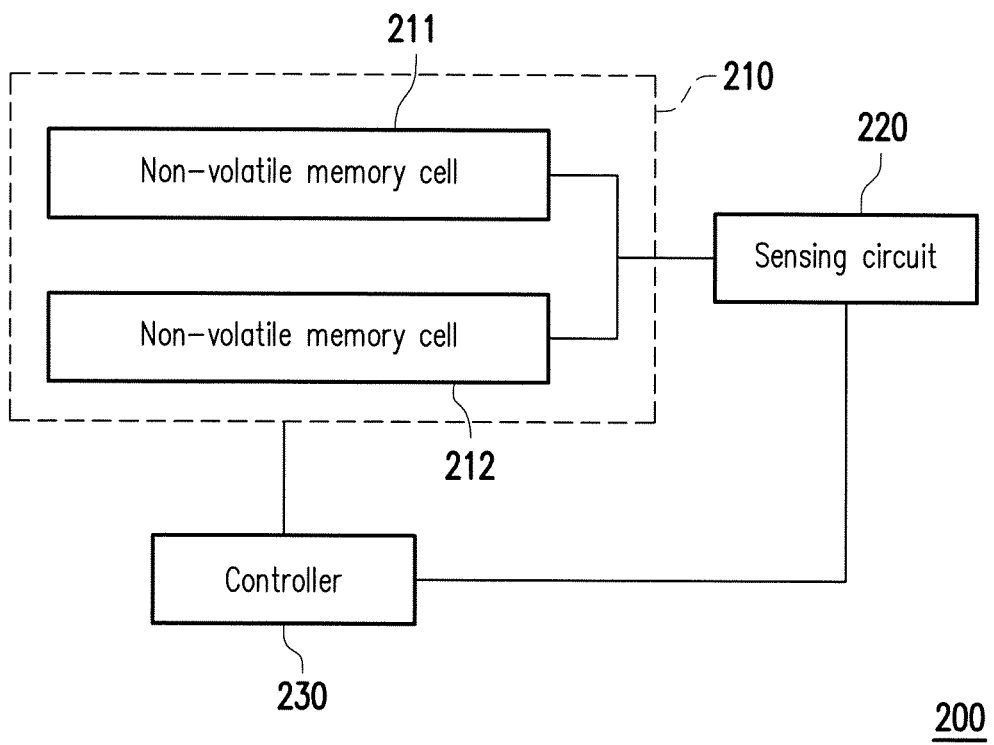
FIG. 2 illustrates another PUF code providing apparatus according to another embodiment of present disclosure.

Referring to FIG. 2, which illustrates another PUF code providing apparatus according to another embodiment of present disclosure. The PUF code providing apparatus 200 includes a non-volatile memory cell pair 210, a sensing circuit 220, and 2 controller 230. The non-volatile memory cell pair 210 includes two non-volatile memory cells 211 and 212, and is coupled to the sensing circuit 220. The non-volatile memory cells 211 and 212 are further coupled to the controller 230, and the controller 230 is coupled to the sensing circuit, too. In FIG. 2, each of the non-volatile memory cells 211 and 212 is a resistive random-access memory (ReRAM) cell, a conductive bridging random-access memory (CBRAM) cell, or a phase change random-access memory (PCRAM) cell.

In present embodiment, the controller 230 compares the first initial resistance of the non-volatile memory cell 211 and the second initial resistance of the non-volatile memory cell 212. If the first initial resistance is lower than the second initial resistance, the controller 230 may perform a write operation on the non-volatile memory cell 211 to adjust a resistance of the non-volatile memory cell 211 to an adjusted lower resistance. In this case, the controller 230 may keep the second initial resistance unchanged. That is, a difference between the resistances of the non-volatile memory cell 211 and 212 can be enlarged, and a read margin of the PUF providing apparatus 200 may be enlarged.

In another case, if the first initial resistance is lower than the second initial resistance, the controller 230 may perform the write operation on the non-volatile memory cell 212 to adjust a resistance of the non-volatile memory cell 212 to an adjusted higher resistance. In this case, the controller 230 may keep the first initial resistance unchanged. That is, the difference between the resistances of the non-volatile memory cell 211 and 212 also can be enlarged, and the read margin of the PUF providing apparatus 200 may be enlarged, too.

Additional, the write operation may be a set operation or a reset operation.

It should be noted here, the sensing circuit 220 may be a sense amplifier for a memory. The hardware structure of the sensing circuit 220 may be implemented by the sense amplifier known by a person skilled in the art, no special limitation for present embodiment. Of course, the sensing circuit 220 may be any latch circuit rather than the sense amplifier of a memory, too.

Figure 3:
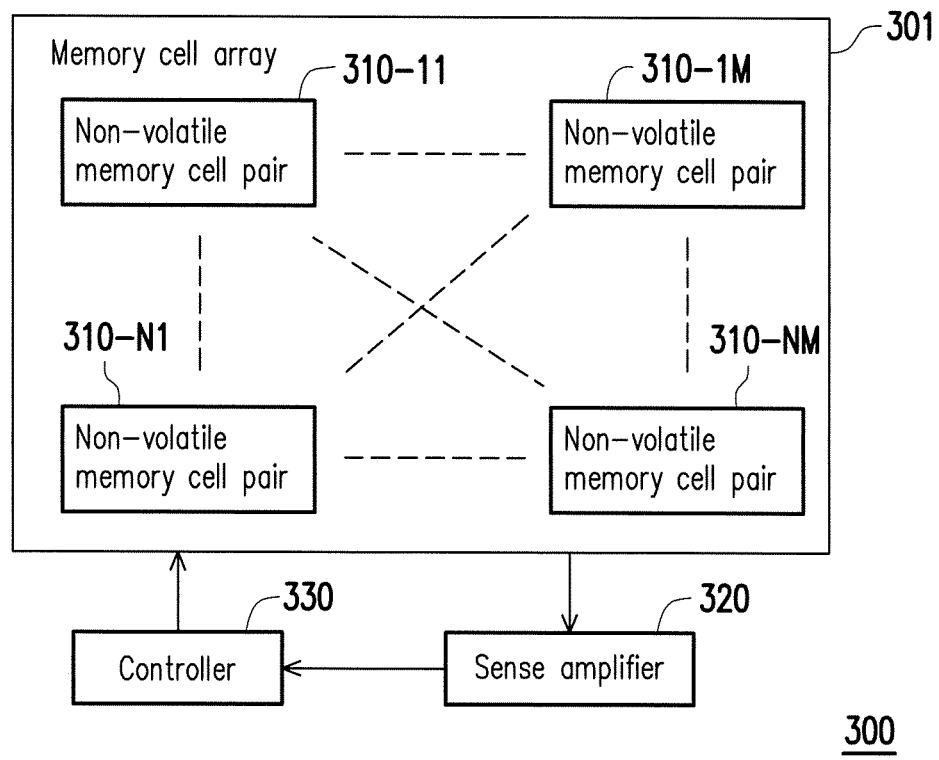
FIG. 3 illustrates another PUF code providing apparatus according to another embodiment of present disclosure.

Referring to FIG. 3, which illustrates another PUF code providing apparatus according to another embodiment of present disclosure. The PUF code providing apparatus 300 includes a memory cell array 301, a sensing circuit 320 and a controller 330. In this embodiment, a plurality of non-volatile memory cell pairs 310-11-310-NM are arranged in the memory cell array 301. The sensing circuit 320 is coupled to the memory cell array 301 and the controller 330. The sensing circuit 320 may compares initial resistances of one of the non-volatile memory cell pairs 310-11-310-NM to generate one PUF code. The controller 330 can perform a write operation on one of non-volatile memory cells of the selected non-volatile memory cell pair according to the PUF code.

Figure 4A:
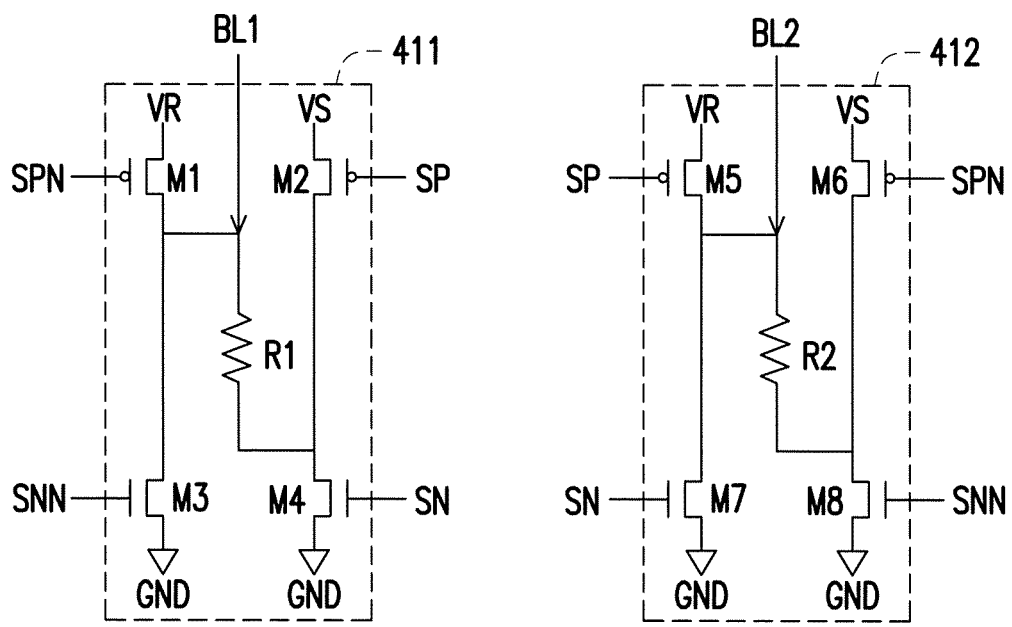
FIG. 4A to FIG. 4C illustrate a plurality of non-volatile memory cell pair according to an embodiment of present disclosure.
Figure 4B:
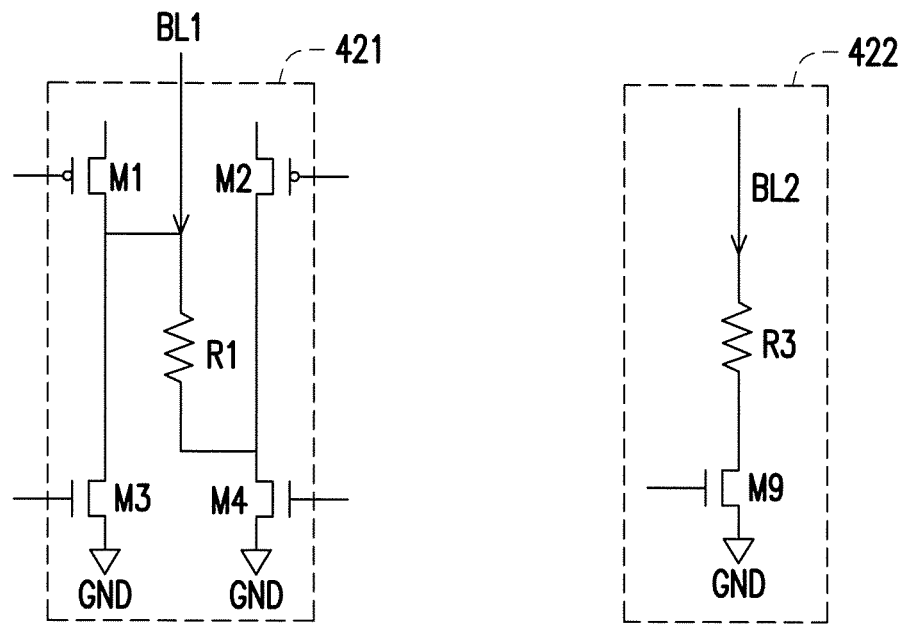
Figure 4C:
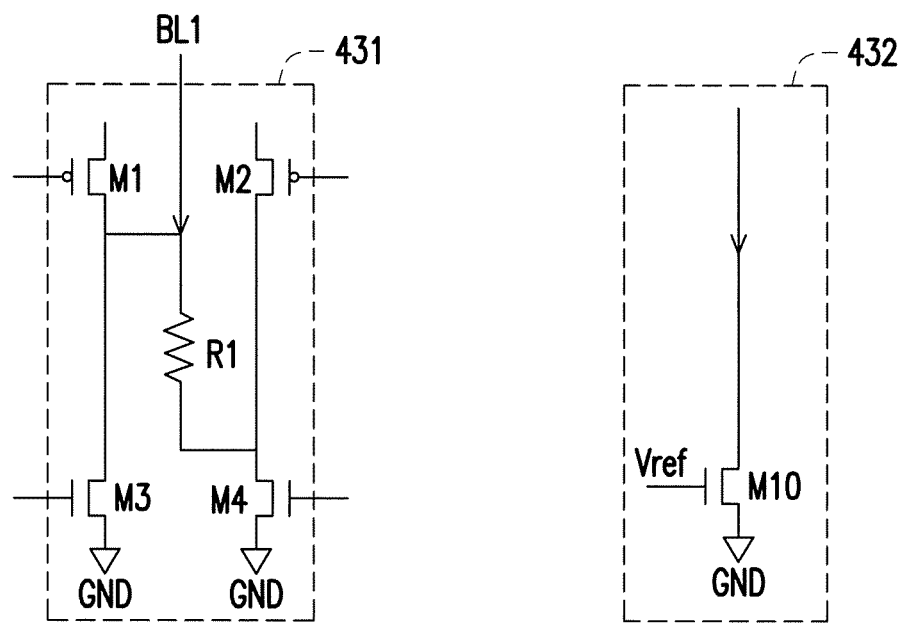

Referring to FIG. 4A to FIG. 4C, which illustrate a plurality of non-volatile memory cell pair according to an embodiment of present disclosure. In FIG. 4A, the non-volatile memory cell pair 410 includes non-volatile memory cell 411 and 412.

The non-volatile memory cell 411 includes transistor M1-M4 and a resistor R1, and the non-volatile memory cell 412 includes transistor M5-M8 and a resistor R2. The transistor M1 receives a reset voltage VR and controlled by a control signal SPN. The transistor M3 is coupled between the transistor M1 and a ground end GND, and is controlled by a control signal SNN. The transistor M2 receives a set voltage VS and controlled by a control signal SP. The transistor M4 is coupled between the transistor M2 and the ground end GND, and is controlled by a control signal SN. The resistor R1 is coupled to a bit line BL1 and coupled between the transistor M1 and the transistor M4.

The transistor M5 receives a reset voltage VR and controlled by the control signal SP. The transistor M7 is coupled between the transistor M5 and the ground end GND, and is controlled by the control signal SN. The transistor M6 receives the reset voltage VR and controlled by the control signal SPN. The transistor M8 is coupled between the transistor M6 and the ground end GND, and is controlled by the control signal SNN. The resistor R2 is coupled to a bit line BL2 and coupled between the transistor M5 and the transistor M8.

Take the non-volatile memory cell 411 as an example. If a set operation is performed on the non-volatile memory cell 411, the transistor M2 and M3 are turned on, the transistor M1 and M4 are cut-off, and the set voltage VS may applied on the resistor R1 through the transistor M2 and the transistor M3. The resistance of the resistor R1 may be set. If a reset operation is performed on the non-volatile memory cell 411, the transistor M1 and M4 are turned on, the transistor M2 and M3 are cut-off, and the reset voltage VR may applied on the resistor R1 through the transistor M1 and the transistor M4. The resistance of the resistor R1 may be reset.

If a set inhibited operation is performed on the non-volatile memory cell 411, the transistor M1 and M4 are turned on, the transistor M2 and M3 are cut-off, and the reset voltage VR may be pulled down to 0V. The resistor R1 is inhibited to be set. If a reset inhibited operation is performed on the non-volatile memory cell 411, the transistor M2 and M3 are turned on, the transistor M1 and M4 are cut-off, and the set voltage VS may be pulled down to 0V. The resistor R1 is inhibited to be reset.

On the other hand, if a read operation is performed on the non-volatile memory cell 411, the set voltage VS and the reset voltage VR are pulled down to 0V, the transistors M1, M2 and M3 are cut-off and the transistor M4 is turned on. The resistance of the resistor R1 can be read through the bit line BL1.

In FIG. 4B, the non-volatile memory cell pair 420 includes non-volatile memory cell 421 and 422. A difference between the non-volatile memory cell pairs 410 and 420 is the non-volatile memory cell 422. The non-volatile memory cell 422 includes a resistor R3 and a transistor M9. The resistor R3 and the transistor M9 are coupled between the bit line BL2 and the ground end GND in series. If the read operation is performed on the non-volatile memory cell pair 420, the transistor M9 is turned on and the resistance of the resistor R3 may be sensed through the bit line BL2.

In FIG. 4C, the non-volatile memory cell pair 430 includes non-volatile memory cell 431 and 432. A difference between the non-volatile memory cell pairs 410 and 430 is the non-volatile memory cell 432. The non-volatile memory cell 432 merely includes a transistor M10. The transistor M10 is coupled between the bit line BL2 and the ground end GND. If the read operation is performed on the non-volatile memory cell pair 430, a control end of the transistor M10 receives a reference voltage Vref and the transistor M10 provides a resistance to the bit line BL2.

Figure 5:
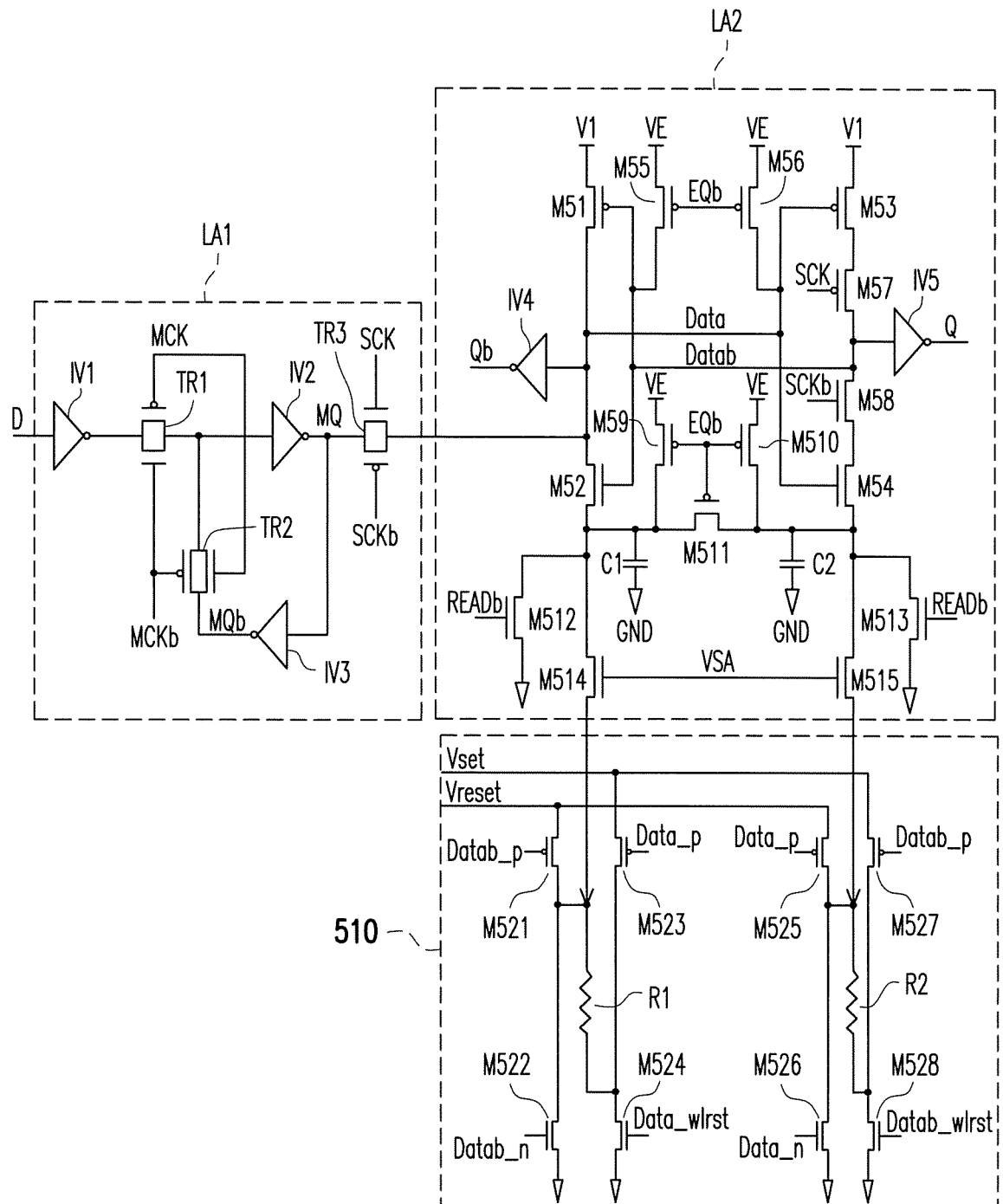
FIG. 5 illustrates another PUF code providing apparatus according to another embodiment of present disclosure.

Referring to FIG. 5, which illustrates another PUF code providing apparatus according to another embodiment of present disclosure. The PUF code providing apparatus 500 includes a first latch LA1, a second latch LA2 and a non-volatile memory cell pair 510. The first latch LA1 and the second latch LA2 form a sense circuit. The first latch LA1 includes inverters IV1-IV3 and transmission gates TR1-TR3. The first latch LA1 receives a data D, and latches the data D to be write data MQ and MQb according to a clock signal MCK and an inverted clock signal MCKb. The data MQ may be blocked or transmitted to the latch LA2 by the transmission gate TR3 according to clocks signals SCK and SCKb.

The second latch LA2 includes inverters IV4 and IV5 and transistors M51-M515. The transistors M51-M54 form a static memory cell structure. The transistors M55 and M56 receive an equalization voltage VE and form a first equalization circuit, and the transistors M59, M510 and M511 receive the equalization voltage VE and form a second equalization circuit. The transistors M512 and M513 are pull down transistors controlled by a read signal READb. The transistors M514 and M515 are coupled between the second latch LA2 the non-volatile memory cell pair 510.

The non-volatile memory cell pair 510 includes transistors M521-M528 and resistors R1 and R2. A structure of the non-volatile memory cell pair 510 is similar to the non-volatile memory cell pair 410. The non-volatile memory cell pair 510 receives a set voltage Vset and a reset voltage Vreset, and control signals Data___p, Data_n, Data_wlrst and Datab_wlrst for performing set, reset, set inhibited, reset inhibited and read operations.

About operation of the PUF providing apparatus 500, the first latch LA1 may receive the data D and store the data D to be a write data MQ and MQb. The write data MQ can be transported to the second latch LA2. The second latch LA2 stores the write data MQ to be the data DATA and DATAb, and generates output data Q and Qb through the inverters IV5 and IV4, respectively.

Then, during a write operation time period, the transmission gate TR3 is cut-off according to the clock signal SCK and SCKb, and the first latch LA1 and second latch LA2 are isolated. Moreover, during the write operation time period, the control signals Data_p, Data_n, Data_wlrst are determined according to the write data MQ and MQb, and each of the non-volatile memory cells in the non-volatile memory cell pair 510 may be set, set inhibited, reset or reset inhibited.

It should be noted here, during the write operation time period, the signal VSA is pulled to 0V, and the transistors M514 and M515 are cut-off to isolate the second latch LA2 and the non-volatile memory cell pair 510.

During a read operation time period, the signal VSA is pulled to a reference voltage value, and the transistors M514 and M515 are turned on for transporting the resistances of resistors R1 and R2 to the second latch LA2. At this time period, the transistors M512 and M513 are cut-off. Such as that, the two resistances of the resistors R1 and R2 can be sensed by the second latch LA2, and a recall data can be obtained and stored by the second latch LA2. That is, a NVFF (non-volatile flip-flop) RRAM (resistive random-access memory) latch circuit can be implemented.

By the embodiment of FIG. 5, a simplify NVFF architecture with write inhibit function can be proposed to minimize the read/write supporting circuitry and the layout area.

For providing a PUF code by the PUF code providing apparatus 500, the read operation can be performed, and initial resistances of the non-volatile memory cell pair 510 can be sensed by the second latch LA2. The PUF code can be obtained and latched in the second latch LA2. After the PUF code being generated, the data D may be written to the first latch LA1, and one of the resistors R1 and R2 may be selected to be set or reset for enlarging read margin of the PUF code providing apparatus 500.

Figure 6:
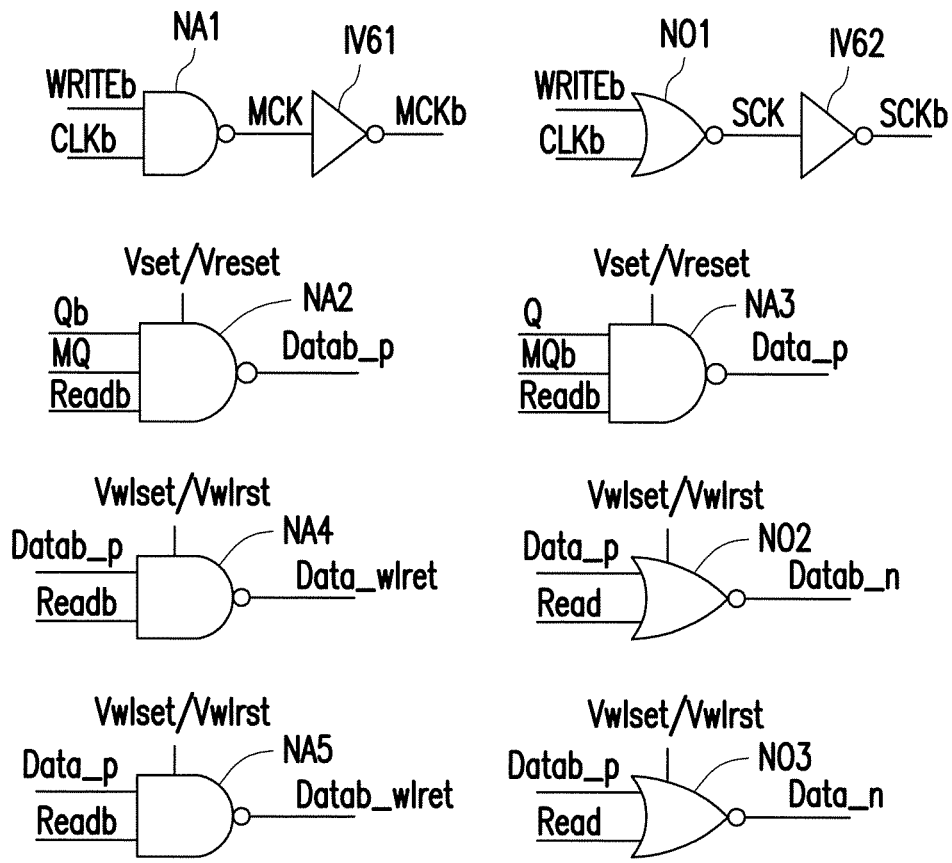
FIG. 6 illustrates a circuit diagram for generating peripheral signals according to the embodiment of FIG. 5.

Referring to FIG. 6, which illustrates a circuit diagram for generating peripheral signals according to the embodiment of FIG. 5. In FIG. 6, the clock signal MCK is generated by a NAND gate NA1 according to an inverted write enable signal WRITEb and an inverted clock signal CLKb. In this embodiment, if the inverted write enable signal WRITEb is logic 0, the write operation is enabled, and if the inverted write enable signal WRITEb is logic 1, the write operation is disabled. Furthermore, a inverter IV61 is coupled to an output end of the NAND gate NA1 for generating the inverted clock signal MCKb. A NOR gate NO1 receives a write enable signal WRITE inverted to the inverted write enable signal WRITEb and the inverted clock signal CLKb, and generates the clock signal SCK. An inverter IV62 is coupled to an output end of the NOR gate NO1, and generates the clock signal SCKb which is inverted to the clock signal SCK.

NAND gates NA2-NA5 and NOR gates NOR gates NO2-NO3 receive the set voltage Vset or the reset voltage Vreset to be power voltage. The NAND gate NA2 receives the output data Qb, the write data MQ and an inverted read enable signal Readb to generate the control signal Datab_p. Herein, if the inverted read enable signal Readb is logic 0, the read operation is enabled, and if the inverted read enable Readb is logic 1, the read operation is disabled. The NAND gate NA3 receives the output data Q, the write data MQB and the inverted read enable signal Readb, and generates the control signal Data_p. The NAND gate NA4 receives the control signal Datab_p and the inverted read enable signal Readb, and generates the control signal Data_wlrst. The NOR gate NO2 receives the control signal Data_p and a read enable signal Read which is inverted to the inverted read enable signal Readb, and generates the control signal Datab_n. The NAND gate NA5 receives the control signal Data_p and the inverted read enable signal Readb, and generates the control signal Datab_wlrst. The NOR gate NO3 receives the control signal Datab_p and the read enable signal Read, and generates the control signal Data_n.

Figure 7:
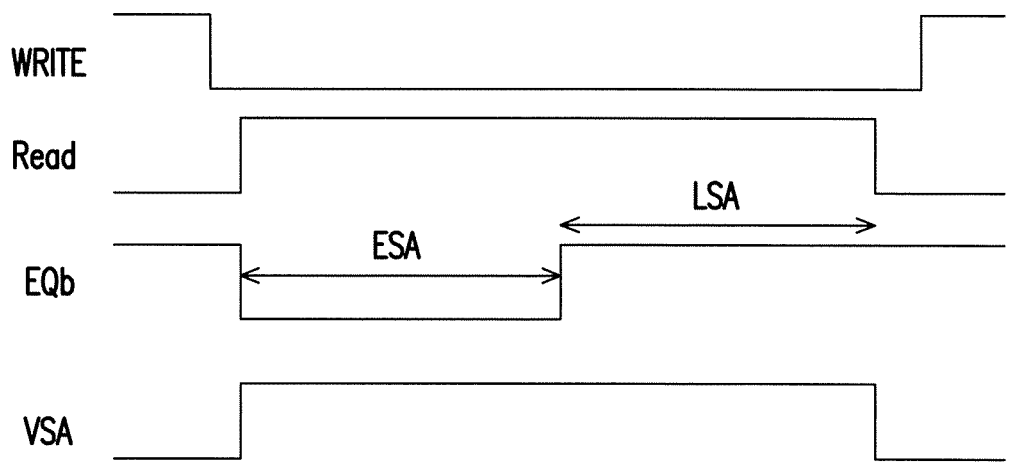
FIG. 7 illustrates a waveform plot for read operation according to the embodiment of FIG. 5.

Referring to FIG. 7, which illustrates a waveform plot for read operation according to the embodiment of FIG. 5. During the read operation time period, the write enable signal WRITE is set to low voltage level, and the read enable signal Read is set to high voltage level. During an equalization time period ESA, an equalization signal EQb is pulled to low voltage level to turn on the transistor M55, M56, M59, M510 and M511 for equalization operation. Then, after the equalization time period ESA, during a latch and sensing time period LSA, the equalization signal EQb is pulled to high voltage level to cut-off the transistor M55, M56, M59, M510 and M511. At same time period, the signal VSA is set to high voltage level, and the resistances of resistors R1 and R2 can be sensed through the turned-on transistors M514 and M515, and an obtained data can be sensed and latched in the second latch LA2.

Figure 8:
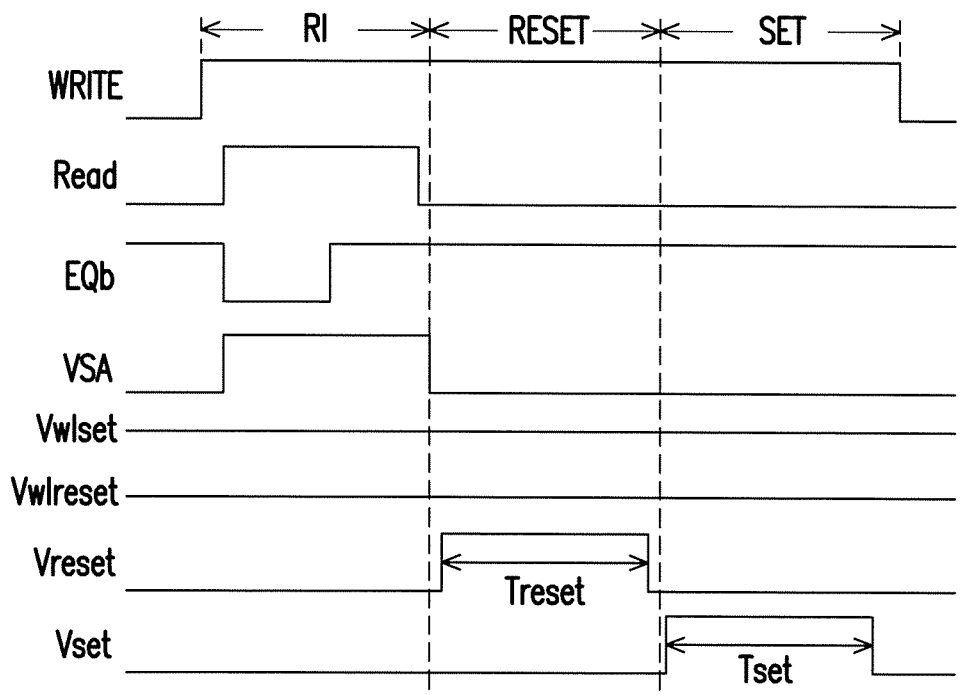
FIG. 8 illustrates another waveform plot of the PUF code providing apparatus according to the embodiment of FIG. 5.

Referring to FIG. 8, which illustrates another waveform plot of the PUF code providing apparatus according to the embodiment of FIG. 5. In FIG. 8, during a recall and inhibited time period RI, the write enable signal WRITE, the signal VSA, and the read enable signal Read are all pulled to high voltage level, and the equalization signal EQb can be pulled to low voltage level and then pulled to high voltage level. The second latch LA2 can be equalized first, and then the resistances R1 and R2 can be sensed by the second latch LA2 to obtain the recall data. During the recall and inhibited time period RI, the non-volatile memory cell pair 510 is inhibited from set or reset operation.

During a reset operation time period RESET, the write enable signal is kept on high voltage level, the read enable signal Read is pulled to low voltage level and the signal VSA is pulled to low voltage level, and the second latch LA2 is isolated from the non-volatile memory cell pair 510. During the reset operation time period RESET, the reset voltage Vreset is pulled to high voltage level for a time period Treset for operating reset operation on a selected resistor. Then, during a set operation time period SET, the set voltage Vset is pulled to high voltage level for a time period Tset for operating reset operation on a selected resistor.

Figure 9:
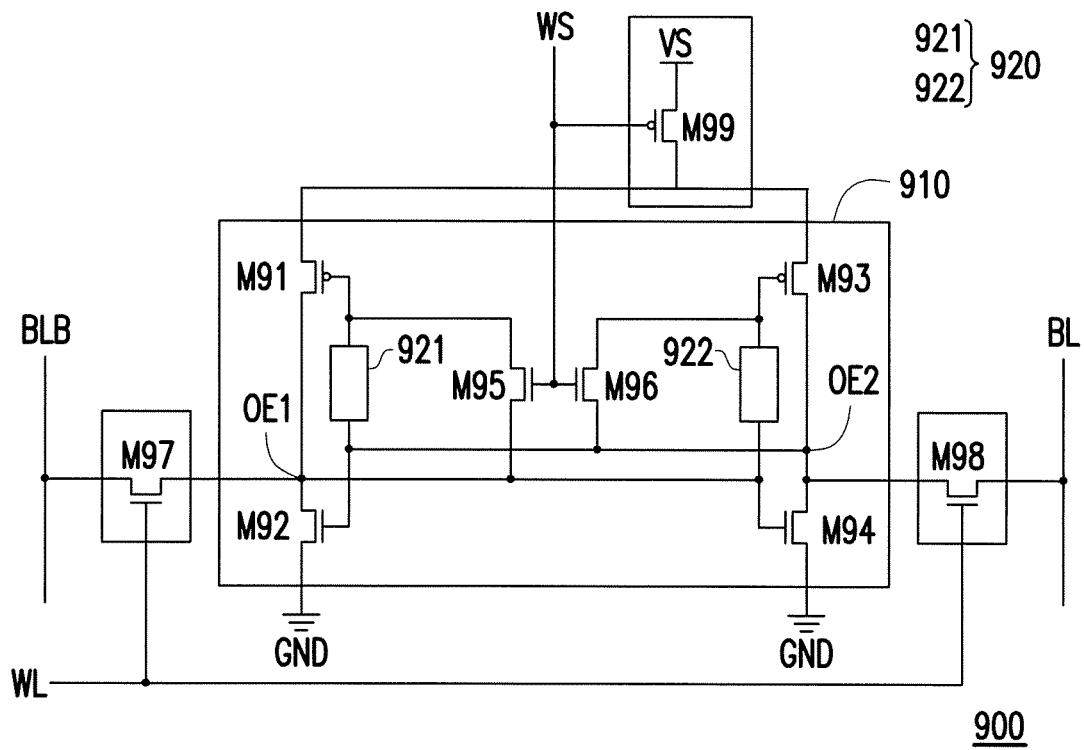
FIG. 9 illustrate a schematic diagram of a PUF code providing apparatus according another embodiment of present disclosure.

Referring to FIG. 9, which illustrates a schematic diagram of a PUF code providing apparatus according another embodiment of present disclosure. The PUF code providing apparatus 900 includes a sensing circuit 910 and a non-volatile memory cell pair 920. The non-volatile memory cell pair 920 includes two non-volatile memory cells 921 and 922. The sensing circuit 910 is a latch, and includes transistors M91-M94. Transistors M95 and M96 are respectively used for operating write operation on the non-volatile memory cells 921 and 922.

In the sensing circuit 910, the transistor M91 has a first end coupled to a power source VS, a second end coupled to a first output end OE1, and a control end coupled to a first end of the non-volatile memory cell 921. The transistor M92 has a first end coupled to the first output end OE1, a second end coupled to a reference ground GND, and a control end coupled to the second end of the non-volatile memory cell 921 and a second output end OE2. The transistor M93 has a first end coupled to the power source VS, a second end coupled to the second output end OE2, and a control end coupled to a first end of the non-volatile memory cell 922. The transistor M94 has a first end coupled to the second output end OE2, a second end coupled to the reference ground GND, and a control end coupled to the second end of the non-volatile memory cell 922 and the first output end OE1. The transistor M95 is coupled between the first end of the non-volatile memory cell 921 and the first output end OE1, and controlled by a write signal WS. The transistor M96 is coupled between the first end of the non-volatile memory cell 922 and the second output end OE2, and controlled by the write signal WS.

The sensing circuit 910 can sense initial resistances of the non-volatile memory cells 921 and 922 to generate a PUF code, and latched the PUF code. On the other hand, the PUF code providing apparatus 900 further includes switches formed by transistors M97 and M98. The transistor M97 is coupled between a bit line BLB and the first output end OE1, and the transistor M98 is coupled between a bit line BL and the second output end OE2, and both of the transistors M97 and M98 are controlled by the world line signal WL. If the transistors M97 and M98 are turned on by the word line signal WL, the PUF code can be provided to the bit line BL and BLB.

In FIG. 9, a transistor M99 is coupled between the transistors M91, M93 and the power source VS. The transistor M99 is controlled by the write signal WS, and is used to pass the power source VS according to the write signal WS when the transistor M99 is turned on.

In detail, during a write operation, if a data "0" is written into the PUF code providing apparatus 900, a power voltage VDD can be provided to the bit line BLB and the write signal WS, and the bit line BL can be coupled to the reference ground GND (=0V). If the transistors M97 and M98 are enabled by the word line signal WL, a voltage on the first output end OE1 equals VDD−Vt1 and a voltage on the output end OE2 equals the reference ground GND, where Vt1 is a threshold voltage of the transistor M97. Since the transistor M95 is turned on by the write signal WS, the non-volatile memory cell 921 can be biased by VDD−Vt1−0 and can be set to low resistance state (LRS). Further, since the transistor M96 is turned on by the write signal WS, the non-volatile memory cell 922 can be biased by 0−(VDD−Vt1) and can be reset to high resistance state (HRS).

During the write operation, if a data "1" is written into the PUF code providing apparatus 900, the power voltage VDD can be provided to the bit line BL and the write signal WS, and the bit line BLB can be coupled to the reference ground GND (=0V). If the transistors M97 and M98 are enabled by the word line signal WL, the voltage on the second output end OE2 equals VDD−Vt2 and the voltage on the first end OE1 equals the reference ground GND, where Vt2 is a threshold voltage of the transistor M98. Since the transistor M95 is turned on by the write signal WS, the non-volatile memory cell 921 can be biased by 0−(VDD−Vt2) and can be reset to high resistance state (HRS). Further, since the transistor M96 is turned on by the write signal WS, the non-volatile memory cell 922 can be biased by VDD−Vt2−0 and can be set to low resistance state (LRS).

It can be seen here, in present embodiment, data can be simultaneously write to the sensing circuit 910 and the non-volatile memory cells 921 and 922 without extra store mode operation. Furthermore, the set and reset operation on the non-volatile memory cell 921 and 922 can be executed concurrency.

During a read operation, the write signal WS is set to 0V for turning on the transistor M99 and cutting off the transistors M95 and M96, and the transistors M97 and M98 are turned-on by the word line signal WL. At this time, if the non-volatile memory cell 921 is LRS and the non-volatile memory cell 922 is HRS, the voltage on the first output end OE1 (equals the power voltage VDD) can be transmitted to the bit line BLB through the transistor M97, and the voltage on the second output end OE2 (equals the reference ground GND) can be transmitted to the bit line BL through the transistor M98. Data with logic 0 can be read-out.

On the other hand, during the read operation, if the non-volatile memory cell 921 is HRS and the non-volatile memory cell 922 is LRS, the voltage on the second output end OE2 (equals the power voltage VDD) can be transmitted to the bit line BL through the transistor M98, and the voltage on the first output end OE1 (equals the reference ground GND) can be transmitted to the bit line BLB through the transistor M97. Data with logic 1 can be read-out.

That is, in present embodiment, data in the sensing circuit 910 can be recalled when the transistor M99 is turned on for providing the power source VS to the sensing circuit 910. No extra recall mode is required in present embodiment.

On the other hand, in another embodiment, the transistors M95 and M96 and the transistor M99 can be respectively controlled by different signals. In detail, the transistor M99 can be controlled by a power gating signal rather than the write signal WS. Herein, the write signal WS may keep high during the write operation and may be controlled by bit line decoding information. The power gating may be set to high or certain DC level of a bias voltage to reduce a current at standby mode.

It should be noted here, the hardware structure of the sensing circuit 910 is not limited to the sensing circuit 910 in FIG. 9. Any hardware structure of a latch known by a person skilled in the art can be implemented to be the sensing circuit 910.

Figure 10:
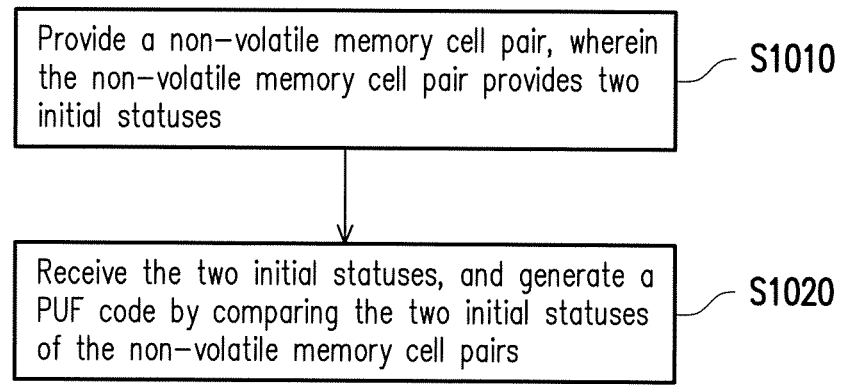
FIG. 10 illustrates a flow chart of a PUF code providing method according an embodiment of present disclosure.

Referring to FIG. 10, which illustrates a flow chart of a PUF code providing method according an embodiment of present disclosure. In a step S1010, a non-volatile memory cell pair is provided, and the non-volatile memory cell pair provides two initial statuses. In a step S1020, the two initial statuses are received, and a PUF code can be generated by comparing the two initial statuses of non-volatile memory cell pair, where the initial statuses may be initial resistances of two non-volatile memory cells. Detail operations of the step S1010 and S1020 can be referred to the embodiments mentioned above, and no more repeated description here.

In summary, the present disclosure provides the PUF code providing apparatus including a non-volatile memory cell pair. The non-volatile memory cell pair provides two initial statuses, and a PUF code can be generated by comparing the two initial statuses. In semiconductor manufacture, the initial status of a non-volatile memory cell is determined by processing parameter of a chip. That is, the initial status of the non-volatile memory cell is random, and the generated PUF code is unique and unable to be cloned.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A physical unclonable function (PUF) code providing apparatus, comprising:
   a non-volatile memory cell pair, providing a first initial resistance to be a first initial status and providing a second initial resistance to be a second initial status;
   a sensing circuit, couple to the non-volatile memory cell pair, reading two initial statuses of the non-volatile memory cell pair and generating a PUF code by comparing the two initial statuses of the non-volatile memory cell pair; and
   a controller, coupled to the non-volatile memory cell pair and the sensing circuit, wherein if the first initial resistance is lower than the second initial resistance, the controller further performs a write operation on the first non-volatile memory cell to adjust a resistance of the first non-volatile memory cell to an adjusted lower resistance, and keeps the second initial resistance unchanged, or the controller further performs the write operation on the second non-volatile memory cell to adjust a resistance of the second non-volatile memory cell to an adjusted higher resistance, and keeps the first initial resistance unchanged.

2. The PUF code providing apparatus as claimed in claim 1, wherein the non-volatile memory cell pair comprises:
   a first non-volatile memory cell, providing the first n a resistance to be the first initial status; and
   a second non-volatile memory cell, providing the second initial resistance to be the second initial status.

3. The PUF code providing apparatus as claimed in claim 2, wherein the sensing circuit is a sense amplifier, wherein the sense amplifier receives the first and second initial resistances and generates the PUF code by sense a difference of the first and second initial resistances.

4. The PUF code providing apparatus as claimed in claim 2, wherein each of the non-volatile memory cells is a resistive random-access memory (ReRAM) cell, a conductive bridging random-access memory (CBRAM) cell, or a phase change random-access memory (PCRAM) cell.

5. The PUF code providing apparatus as claimed in claim 2, wherein the sensing circuit comprises:
   a latch, coupled to the first non-volatile memory cell and the second non-volatile memory cell, generating the PUF code by comparing the first and second initial resistances and latching the PUF code.

6. The PUF code providing apparatus as claimed in claim 2, wherein the sensing circuit comprises:
   a first latch, storing a write data;
   a second latch, coupled to the non-volatile memory cell pair and receiving the write data, and obtaining a recall data by sensing a difference of the first and second initial resistances,
   wherein, in a read operation mode, the recall data is latched in the second latch, and in a write operation mode, the second latch comparing the recall data and the write data to generate a comparison result.

7. The PUF code providing apparatus as claimed in claim 6, wherein the first non-volatile memory cell is a resistive random-access memory (ReRAM) cell, a conductive bridging random-access memory (CBRAM) cell, or a phase change random-access memory (PCRAM) cell, and the second non-volatile memory cell is a reference resistor.

8. The PUF code providing apparatus as claimed in claim 2, wherein the sensing circuit comprises:
   a first transistor, has a first end coupled to a power source, a second end coupled to a first output end, and a control end coupled to a first end of the first non-volatile memory cell;
   a second transistor, has a first end coupled to the first output end, a second end coupled to a reference ground, and a control end coupled to the second end of the first non-volatile memory cell and a second output end;
   a third transistor, has a first end coupled to the power source, a second end coupled to the second output end, and a control end coupled to a first end of the second non-volatile memory cell;
   a fourth transistor, has a first end coupled to the second output end, a second end coupled to the reference ground, and a control end coupled to the second end of the second non-volatile memory cell and the first output end;
   a fifth transistor, coupled between the first end of the first non-volatile memory cell and the first output end, and controlled by a write signal; and
   a sixth transistor, coupled between the first end of the second non-volatile memory cell and the second output end, and controlled by the write signal.

9. The PUF code providing apparatus as claimed in claim 8, wherein the sensing circuit further comprises:
   a first switch, coupled between a first bit line and the first output end, and coupled by a word line signal; and
   a second switch, coupled between a second bit line and the second output end, and controlled by the word line signal.

10. The PUF code providing apparatus as claimed in claim 8, wherein the sensing circuit further comprises:

a switch, coupled between the power source and the first ends of the first transistor and the third transistor, and controlled by the write signal.

11. The PUF code providing apparatus as claimed in claim 1, wherein the non-volatile memory cell pairs comprises a resistive random-access memory (ReRAM) cell, a conductive bridging random-access memory (CBRAM) cell, a phase change random-access memory (PCRAM) cell, a magneto resistive random-access memory (MRAM), a ferroelectric random-access memory (FRAM) cell, or a floating gate memory cell.

12. The PUF code providing apparatus as claimed in claim 1, wherein the two initial statuses is generated with or without performing forming operation on the non-volatile memory cell pair, where the non-volatile memory cell pair is a resistive random-access memory (ReRAM) cell pair, a conductive bridging random-access memory (CBRAM) cell pair, or a phase change random-access memory (PCRAM) cell pair.

13. A physical unclonable function (PUF) code generating method, comprising:

providing a non-volatile memory cell pair, wherein the non-volatile memory cell pair provides two initial statuses;

receiving the two initial statuses, and generating the PUF code by comparing the two initial statuses of the non-volatile memory cell pair, wherein the two initial statuses are a first initial resistance and a second initial resistance;

if the first initial resistance is lower than the second initial resistance:

performing a write operation on a first non-volatile memory cell corresponding to the first initial resistance to adjust a resistance of the first non-volatile memory cell to an adjusted lower resistance, and keeping the second initial resistance unchanged;

or performing the write operation on the second non-volatile memory cell corresponding to the second initial resistance to adjust a resistance of a second non-volatile memory cell to an adjusted higher resistance, and keeping the first initial resistance unchanged.

14. The PUF code generating method as claimed in claim 13, wherein the non-volatile memory cell pair is a resistive random-access memory (ReRAM) cell pair, a conductive bridging random-access memory (CBRAM) cell pair, or a phase change random-access memory (PCRAM) cell pair.

* * * * *